(12) United States Patent
Huang et al.

(10) Patent No.: US 10,190,262 B2
(45) Date of Patent: Jan. 29, 2019

(54) OPTICAL BRIGHTENING AGENT COMPOSITION

(71) Applicant: Teh Fong Min International Co., Ltd., Taipei (TW)

(72) Inventors: Yu-Lin Huang, Taipei (TW); Randall Bruce Nelson, Vancouver, WA (US); Tseng-Peng Li, Taipei (TW); Chih-Wen Yeh, Taipei (TW)

(73) Assignee: TEH FONG MIN INTERNATIONAL CO., LTD., Taipei (TW)

( * ) Notice: Subject to any disclaimer, the term of this patent is extended or adjusted under 35 U.S.C. 154(b) by 0 days.

(21) Appl. No.: 15/414,270

(22) Filed: Jan. 24, 2017

(65) Prior Publication Data
US 2017/0218572 A1    Aug. 3, 2017

(30) Foreign Application Priority Data
Jan. 28, 2016    (TW) .............................. 105102610 A

(51) Int. Cl.
*C08K 5/42* (2006.01)
*C09D 17/00* (2006.01)
*D21H 21/30* (2006.01)

(52) U.S. Cl.
CPC .............. *D21H 21/30* (2013.01); *C08K 5/42* (2013.01); *C09D 17/003* (2013.01)

(58) Field of Classification Search
CPC .................................. D21H 21/30; C08K 5/42
See application file for complete search history.

(56) References Cited

FOREIGN PATENT DOCUMENTS

CN          101760048         *   6/2010

OTHER PUBLICATIONS

Translation for CN 101760048, Jun. 30, 2010.*
Abstract for CN 101760048, Jun. 30, 2010.*

* cited by examiner

*Primary Examiner* — C Melissa Koslow
(74) *Attorney, Agent, or Firm* — Muncy, Geissler, Olds & Lowe, P.C.

(57) ABSTRACT

An optical brightening agent composition having an optical brightening agent, a dispersing agent and water. The optical brightening agent and the dispersing agent are triazine-stilbenes and methylene dinaphthalene sulfonates, respectively. Applications of an optical brightening agent composition for optically brightening paper or cardboards, optically brightening surfaces of paper or cardboards, and coating or adhesively pressing an optical brightening agent composition on paper or cardboards, are also provided.

10 Claims, 6 Drawing Sheets

OPTICAL BRIGHTENING AGENT COMPOSITION

BACKGROUND OF THE INVENTION

1. Field of the Invention

The present disclosure relates to an optical brightening agent composition, particularly an optical brightening agent composition for papermaking and an application method thereof.

2. Description of the Prior Art

In the papermaking industry, it is an indispensable step to add moderate optical brightening agents (OBA) into pulp for better brightness of manufactured paper or cardboards by optic functions of optical brightening agents. Currently, triazine-stilbenes as ingredients of optical brightening agents broadly available in the papermaking industry are categorized into three types, for example, di-sulfonated triazine-stilbenes, tetra-sulfonated triazine-stilbenes, and hexa-sulfonated triazine-stilbenes according to the number of sulfonate groups in chemical formulae of triazine-stilbenes. However, an optical brightening agent based on triazine-stilbenes only in existing techniques has limited brightness effect in general which causes a drawback that an optical brightening agent may not perform well.

SUMMARY OF THE INVENTION

The present disclosure offers an optical brightening agent composition consisting of an optical brightening agent, a dispersing agent and water wherein the optical brightening agent and the dispersing agent are triazine-stilbenes and sodium methylene dinaphthalene sulfonates, respectively. The triazine-stilbenes are chemical compounds, as shown in chemical formula (1):

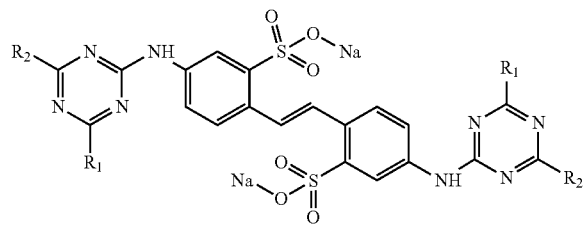

(1)

The sodium methylene dinaphthalene sulfonates are chemical compounds, as shown in chemical formula (2), chemical formula (3), or chemical formula (4):

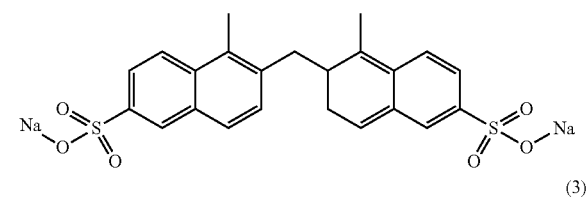

(2)

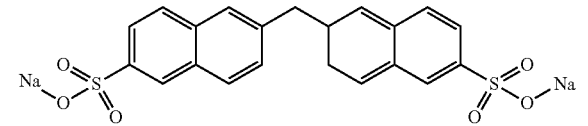

(3)

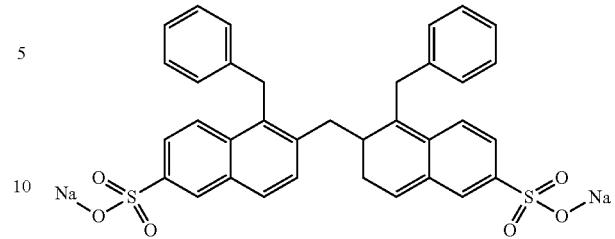

(4)

where $R_1$ is a functional group, as shown in chemical formula (5), chemical formula (6), or chemical formula (7);

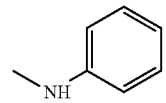

(5)

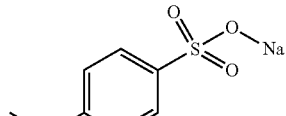

(6)

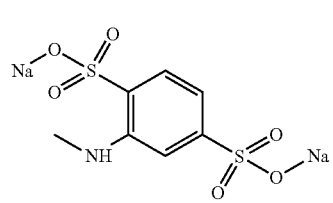

(7)

where $R_2$ is a functional group, as shown in chemical formula (8), chemical formula (9), or chemical formula (10):

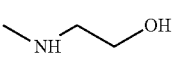

(8)

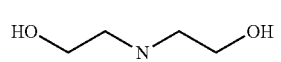

(9)

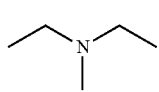

(10)

The triazine-stilbenes are di-sulfonated triazine-stilbenes when $R_1$ is a functional group as shown in chemical formula (5); the triazine-stilbenes are tetra-sulfonated triazine-stilbenes when $R_1$ is a functional group as shown in chemical formula (6); the triazine-stilbenes are hexa-sulfonated triazine-stilbenes when $R_1$ is a functional group as shown in chemical formula (7).

In an embodiment for proportions of ingredients, the optical brightening agent, the dispersing agent and water in an optical brightening agent composition account for 20~40%, 5~25% and 35~75% of total weight, respectively.

In another embodiment for proportions of ingredients, the optical brightening agent, the dispersing agent and water in an optical brightening agent composition account for 15~40%, 2~25% and 35~83% of total weight, respectively.

To prepare an optical brightening agent composition, a user should evenly mix water and the optical brightening agent of triazine-stilbenes pro rata or agitate a concentrated solution for the optical brightening agent of triazine-stilbenes in which the dispersing agent is added simultaneously, keep continuous stirring of both agents for homogeneous mixing, and pour water to adjust a concentration for an optical brightening agent composition in the present disclosure.

The present disclosure offers applications of an optical brightening agent composition for optical brightening effect of paper or cardboards, particularly optical brightening effect of surfaces of paper or cardboards. In detail, an optical brightening agent composition should be coated or adhesively pressed on paper or cardboards.

An optical brightening agent composition should be added in a pulp suspension liquid, a pulp slurry suspension or pulp. In detail, pulp is non-wood pulp or wood pulp.

The present disclosure offers a method of using an optical brightening agent composition to brighten paper. The method comprises each of a pulp suspension liquid, a pulp slurry suspension and pulp or a combination thereof; the method is to add an optical brightening agent composition in each of a pulp suspension liquid, a pulp slurry suspension and pulp or a combination thereof and manufacture and dry a piece of paper or a cardboard.

Furthermore, the method is to add an optical brightening agent composition, which has been diluted by water, in each of a pulp suspension liquid, a pulp slurry suspension and pulp or a combination thereof. In detail, the weight percentage concentration of an optical brightening agent composition diluted by water is 0.1%.

DETAILED DESCRIPTION OF THE PREFERRED EMBODIMENT

The present disclosure offers an optical brightening agent composition. With weight percentage concentrations of ingredients adjusted, the optical brightening agent composition consists of an optical brightening agent (22% of total weight), a dispersing agent (5, 10 or 15% of total weight) and water. To prepare an optical brightening agent composition, a user has to evenly mix water and the optical brightening agent of triazine-stilbenes pro rata or agitate a concentrated solution for the optical brightening agent of triazine-stilbenes in which the dispersing agent is added simultaneously and further keep continuous stirring of both agents for homogeneous mixing. In detail, the optical brightening agent of triazine-stilbenes may comprise each of di-sulfonated triazine-stilbenes, tetra-sulfonated triazine-stilbenes and hexa-sulfonated triazine-stilbenes.

Figure 1:
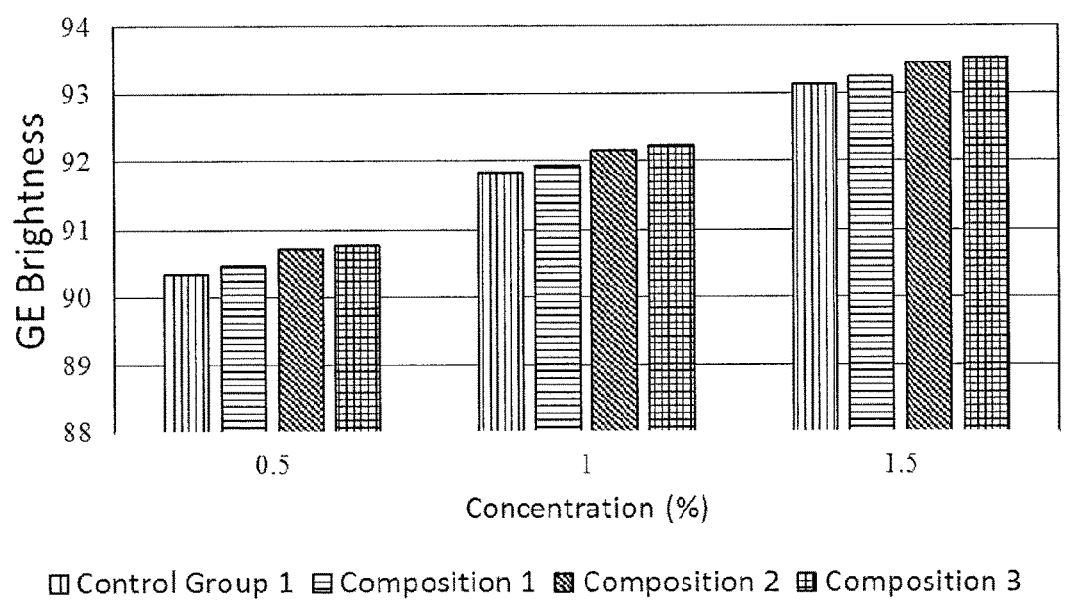
FIG. 1 is a bar graph which illustrates the effect of an optical brightening agent composition on GE Brightness in an embodiment.
Figure 2:
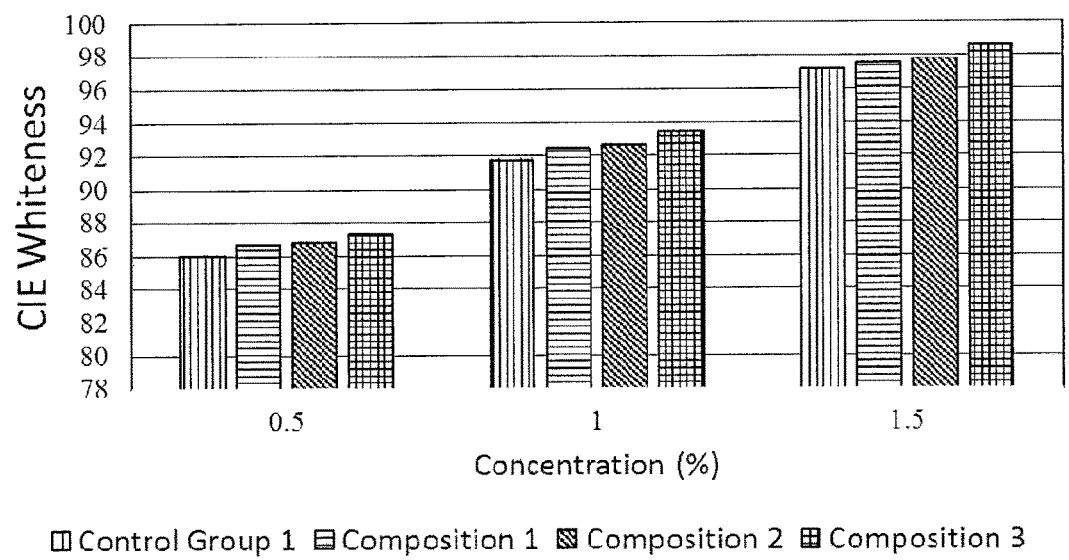
FIG. 2 is a bar graph which illustrates the effect of an optical brightening agent composition on CIE Whiteness in an embodiment.

Referring to Table 1: Control Group 1, tetra-sulfonated triazine-stilbenes, in which no dispersing agent is added into the optical brightening agent, the triazine-stilbenes are chemical compounds, as shown in chemical formula (1), and the triazine-stilbenes are tetra-sulfonated triazine-stilbenes when $R_1$ is a functional group as shown in chemical formula (6), where $R_2$ is a functional group, as shown in chemical formula (9); Composition 1, Composition 2 and Composition 3 based on an optical brightening agent in the present disclosure, in which a dispersing agent (weight percentage concentration of 5, 10 and 15%, respectively) is added. With the compound of Control Group 1 (Composition 1, Composition 2 and Composition 3) diluted by water for preparation of solutions including three different weight percentage concentrations of 0.5, 1 and 1.5%, the solutions of Control Group 1 (Composition 1, Composition 2 and Composition 3) are added into pulp slurry suspensions for manufacture of paper and GE Brightness as well as CIE (Commission internationale de l'éclairage) Whiteness tests which are compared and shown in Table 1, FIG. 1 and FIG. 2. In detail, the dispersing agent is sodium methylene dinaphthalene sulfonates, as shown in chemical formula (2).

TABLE 1

| Composition | Concentration (%) | GE Brightness | CIE Whiteness |
| --- | --- | --- | --- |
| Control group 1 (tetra-sulfonated triazine-stilbenes) | 0.5 | 90.34 | 86.03 |
| | 1 | 91.83 | 91.68 |
| | 1.5 | 93.12 | 97.20 |
| Composition 1 (tetra-sulfonated triazine-stilbenes + 5% dispersing agent, as shown in chemical formula (2)) | 0.5 | 90.48 | 86.73 |
| | 1 | 91.93 | 92.43 |
| | 1.5 | 93.26 | 97.53 |
| Composition 2 (tetra-sulfonated triazine-stilbenes + 10% dispersing agent, as shown in chemical formula (2)) | 0.5 | 90.72 | 86.87 |
| | 1 | 92.17 | 92.63 |
| | 1.5 | 93.46 | 97.77 |
| Composition 3 (tetra-sulfonated triazine-stilbenes + 15% dispersing agent, as shown in chemical formula (2)) | 0.5 | 90.77 | 87.31 |
| | 1 | 92.23 | 93.44 |
| | 1.5 | 93.52 | 98.63 |

As shown in Table 1, Composition 1, Composition 2 and Composition 3 based on an optical brightening agent composition in the present disclosure, in which the dispersing agent (weight percentage concentration of 5, 10 and 15%, respectively) is added, have better performance in GE Brightness and CIE Whiteness than Control Group 1 (tetra-sulfonated triazine-stilbenes).

Figure 3:
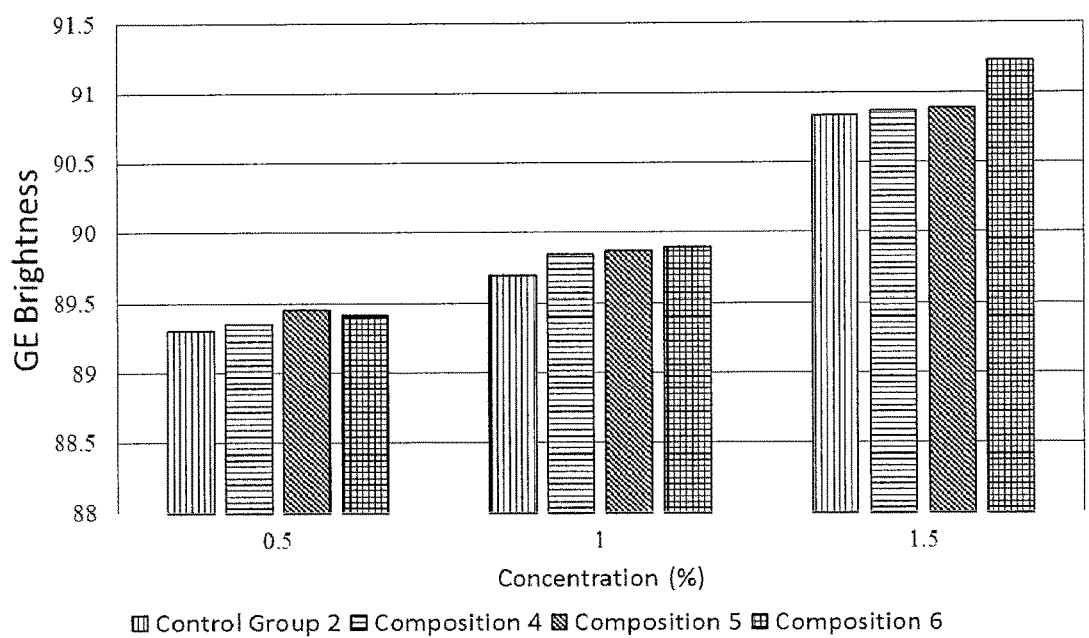
FIG. 3 is a bar graph which illustrates the effect of an optical brightening agent composition on GE Brightness in another embodiment.
Figure 4:
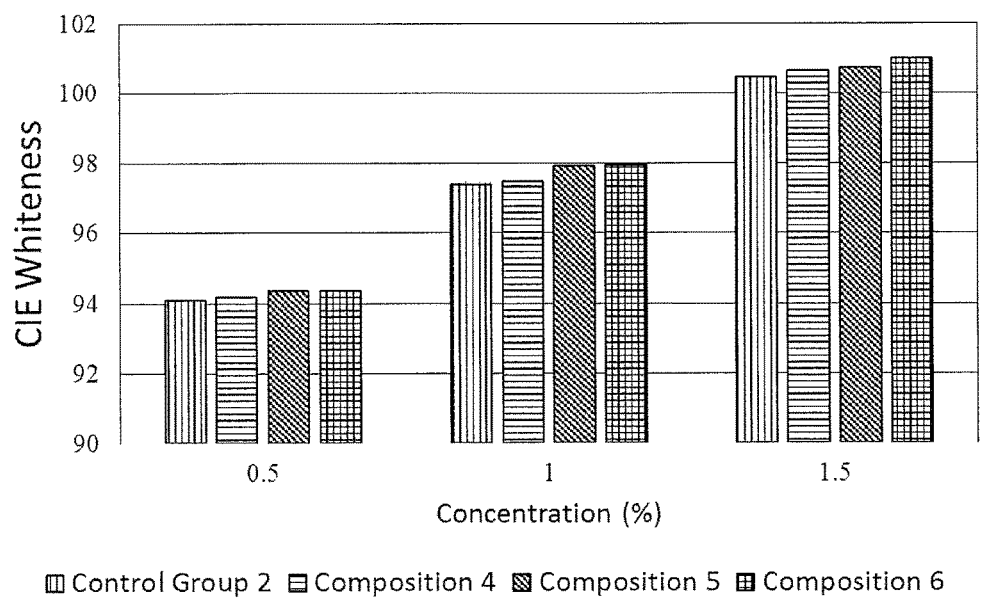
FIG. 4 is a bar graph which illustrates the effect of an optical brightening agent composition on CIE Whiteness in another embodiment.

Referring to Table 2: Control Group 2, hexa-sulfonated triazine-stilbenes, in which no dispersing agent is added into the optical brightening agent, the triazine-stilbenes are chemical compounds, as shown in chemical formula (1), and the triazine-stilbenes are hexa-sulfonated triazine-stilbenes when $R_1$ is a functional group as shown in chemical formula (7), where $R_2$ is a functional group, as shown in chemical formula (10); Composition 4, Composition 5 and Composition 6 based on an optical brightening agent composition in the present disclosure, in which a dispersing agent (weight percentage concentration of 5, 10 and 15%, respectively) is added. With the compound of Control Group 2 (Composition 4, Composition 5 and Composition 6) diluted by water for preparation of solutions including three different weight percentage concentrations of 0.5, 1 and 1.5%, the solutions of Control Group 2 (Composition 4, Composition 5 and Composition 6) are added into starch pastes and evenly applied on base paper for drying, calendering, and GE Brightness as well as CIE Whiteness tests which are compared and shown in Table 2, FIG. 3 and FIG. 4. In detail, the dispersing agent is sodium methylene dinaphthalene sulfonates, as shown in chemical formula (3).

TABLE 2

| Composition | Concentration (%) | GE Brightness | CIE Whiteness |
| --- | --- | --- | --- |
| Control group 2 | 0.5 | 89.30 | 94.10 |
| (hexa-sulfonated | 1 | 89.69 | 97.38 |
| triazine-stilbenes) | 1.5 | 90.83 | 100.47 |
| Composition 4 | 0.5 | 89.35 | 94.19 |
| (hexa-sulfonated triazine- | 1 | 89.84 | 97.47 |
| stilbenes + 5% dispersing | 1.5 | 90.87 | 100.65 |
| agent, as shown in chemical formula (3)) | | | |
| Composition 5 | 0.5 | 89.45 | 94.35 |
| (hexa-sulfonated triazine- | 1 | 89.87 | 97.93 |
| stilbenes + 10% dispersing | 1.5 | 90.89 | 100.74 |
| agent, as shown in chemical formula (3)) | | | |
| Composition 6 | 0.5 | 89.41 | 94.37 |
| (hexa-sulfonated triazine- | 1 | 89.90 | 97.96 |
| stilbenes + 15% dispersing | 1.5 | 91.23 | 101.00 |
| agent, as shown in chemical formula (3)) | | | |

As shown in Table 2, Composition 4, Composition 5 and Composition 6 based on an optical brightening agent composition in the present disclosure, in which the dispersing agent (weight percentage concentration of 5, 10 and 15%, respectively) is added, have better performance in GE Brightness and CIE Whiteness than Control Group 2 (hexa-sulfonated triazine-stilbenes).

Figure 5:
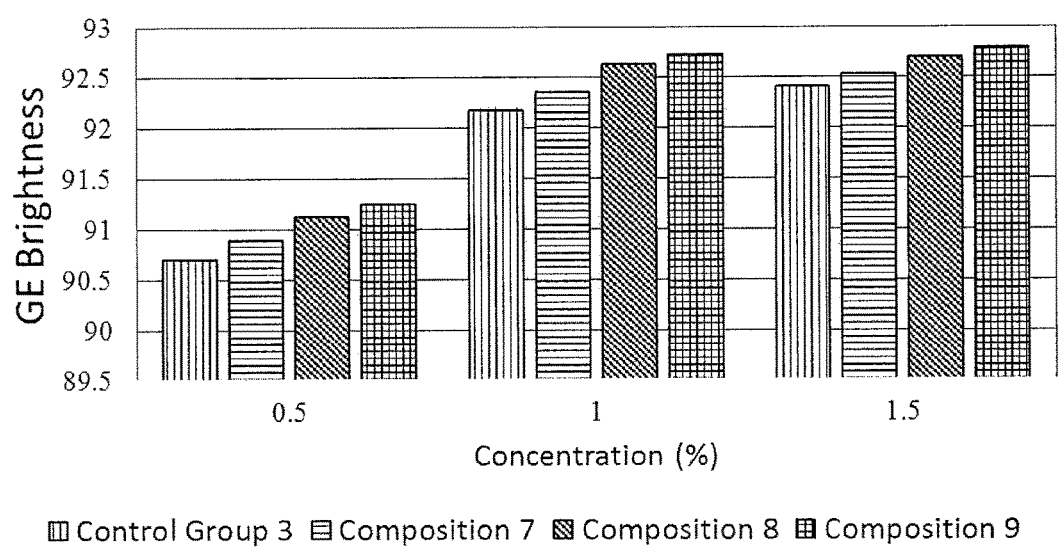
FIG. 5 is a bar graph which illustrates the effect of an optical brightening agent composition on GE Brightness in a further embodiment.
Figure 6:
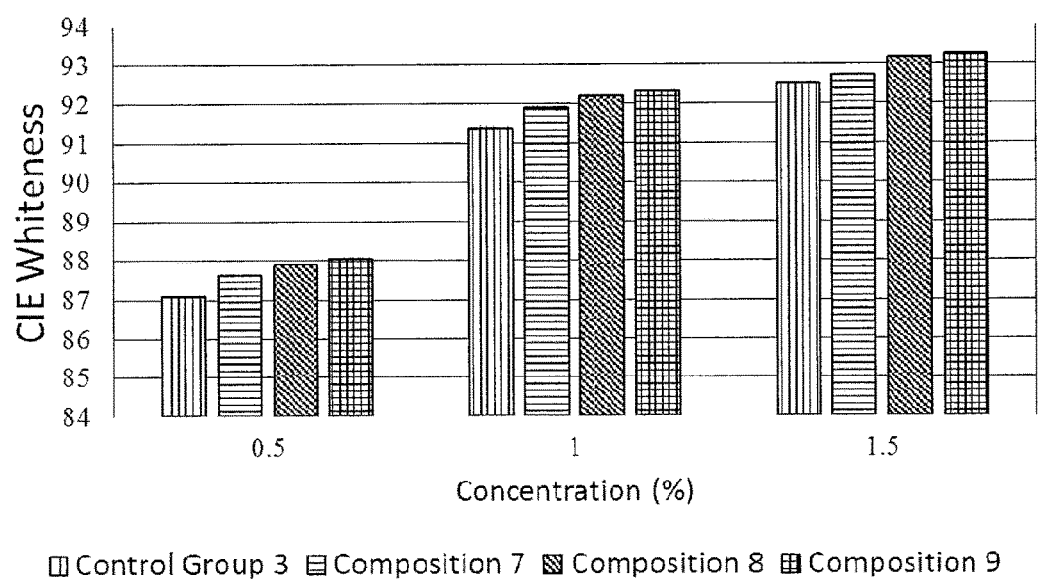
FIG. 6 is a bar graph which illustrates the effect of an optical brightening agent composition on CIE Whiteness in a further embodiment.

Referring to Table 3: Control Group 3, di-sulfonated triazine-stilbenes, in which no dispersing agent is added into the optical brightening agent, the triazine-stilbenes are chemical compounds, as shown in chemical formula (1), and the triazine-stilbenes are di-sulfonated triazine-stilbenes when $R_1$ is a functional group as shown in chemical formula (5) where $R_2$ is a functional group, as shown in chemical formula (8), or chemical formula (9); Composition 7, Composition 8 and Composition 9 based on an optical brightening agent composition in the present disclosure, in which a dispersing agent (weight percentage concentration of 5, 10 and 15%, respectively) is added. With the compound of Control Group 3 (Composition 7, Composition 8 and Composition 9) diluted by water for preparation of solutions including three different weight percentage concentrations of 0.5, 1 and 1.5%, the solutions of Control Group 3 (Composition 7, Composition 8 and Composition 9) are added into starch pastes and evenly applied on base paper for drying, calendering, and GE Brightness as well as CIE Whiteness tests which are compared and shown in Table 3, FIG. 5 and FIG. 6. In detail, the dispersing agent is sodium methylene dinaphthalene sulfonates, as shown in chemical formula (4).

TABLE 3

| Composition | Concentration (%) | GE Brightness | CIE Whiteness |
| --- | --- | --- | --- |
| Control group 3 | 0.5 | 90.70 | 87.10 |
| (di-sulfonated | 1 | 92.17 | 91.37 |
| triazine-stilbenes) | 1.5 | 92.40 | 92.53 |
| Composition 7 | 0.5 | 90.89 | 87.64 |
| (di-sulfonated triazine- | 1 | 92.35 | 91.91 |
| stilbenes + 5% dispersing | 1.5 | 92.53 | 92.75 |
| agent, as shown in chemical formula (4)) | | | |
| Composition 8 | 0.5 | 91.12 | 87.90 |
| (di-sulfonated triazine- | 1 | 92.62 | 92.20 |
| stilbenes + 10% dispersing | 1.5 | 92.69 | 93.19 |
| agent, as shown in chemical formula (4)) | | | |
| Composition 9 | 0.5 | 91.25 | 88.06 |
| (di-sulfonated triazine- | 1 | 92.72 | 92.31 |
| stilbenes + 15% dispersing | 1.5 | 92.79 | 93.29 |
| agent, as shown in chemical formula (4)) | | | |

As shown in Table 3, Composition 7, Composition 8 and Composition 9 based on an optical brightening agent composition in the present disclosure, in which the dispersing agent (weight percentage concentration of 5, 10 and 15%, respectively) is added, have better performance in GE Brightness and CIE Whiteness than Control Group 3 (di-sulfonated triazine-stilbenes).

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:
1. An optical brightening agent composition for optical brightening of surfaces of paper or cardboards consisting of: water, a compound as shown in chemical formula (1), and sodium methylene dinaphthalene sulfonates:

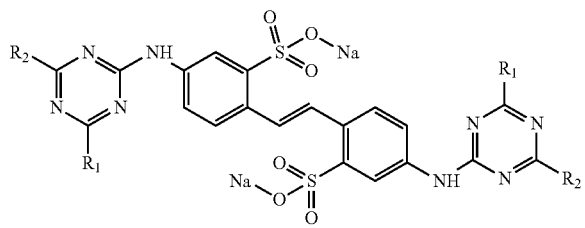

(1)

wherein the sodium methylene dinaphthalene sulfonates are chemical compounds, as shown in chemical formula (2), chemical formula (3) or chemical formula (4):

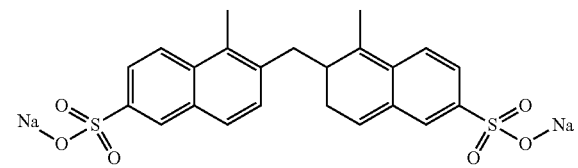

(2)

-continued (3)

[Chemical structure of formula (3): dinaphthalene with methylene bridge and two sodium sulfonate groups]

(4)

[Chemical structure of formula (4): dibenzyl-substituted dinaphthalene with methylene bridge and two sodium sulfonate groups]

R₁ is a functional group, as shown in chemical formula (6), or chemical formula (7):

(6)

[Chemical structure: methylamino benzene sulfonate sodium]

(7)

[Chemical structure: methylamino disulfonate sodium benzene]

and R₂ is a functional group, as shown in chemical formula (8), chemical formula (9), or chemical formula (10):

(8)

[Chemical structure: CH₃NH-CH₂CH₂-OH]

(9)

[Chemical structure: HO-CH₂CH₂-N(CH₃)-CH₂CH₂-OH]

(10)

[Chemical structure: triethylamine-like structure]

2. The optical brightening agent composition as claimed in claim 1 wherein the compound as shown in chemical formula (1), the sodium methylene dinaphthalene sulfonates and water account for 20~40%, 5~25% and 35~75% of total weight, respectively.

3. The optical brightening agent composition as claimed in claim 1 wherein the compound as shown in chemical formula (1), the sodium methylene dinaphthalene sulfonates and water account for 15~40%, 2~25% and 35~83% of total weight, respectively.

4. A paper or cardboards coated or adhesively pressed with an optical brightening agent composition for optical brightening of surfaces of the paper or cardboards consisting of: water, a compound as shown in chemical formula (1), and sodium methylene dinaphthalene sulfonates:

(1)

[Chemical structure of formula (1): stilbene with triazine groups bearing R₁ and R₂ substituents, with sodium sulfonate groups]

wherein the sodium methylene dinaphthalene sulfonates are chemical compounds, as shown in chemical formula (2), chemical formula (3) or chemical formula (4):

(2)

[Chemical structure of formula (2): dimethyl dinaphthalene with methylene bridge and two sodium sulfonate groups]

(3)

[Chemical structure of formula (3): dinaphthalene with methylene bridge and two sodium sulfonate groups]

(4)

[Chemical structure of formula (4): dibenzyl dinaphthalene with methylene bridge and two sodium sulfonate groups]

R₁ is a functional group, as shown in chemical formula (6), or chemical formula (7):

(6)

[Chemical structure: methylamino benzene sulfonate sodium]

-continued (7)

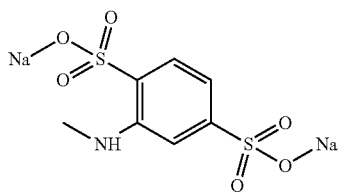

and R$_2$ is a functional group, as shown in chemical formula (8), chemical formula (9), or chemical formula (10):

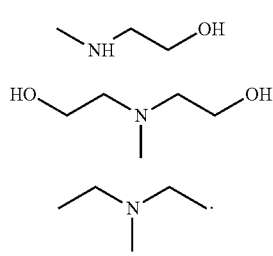

(8)

(9)

(10)

5. A pulp suspension liquid, a pulp slurry suspension or pulp with an optical brightening agent composition for optical surface brightening consisting of: water, a compound as shown in chemical formula (1), and sodium methylene dinaphthalene sulfonates:

(1)

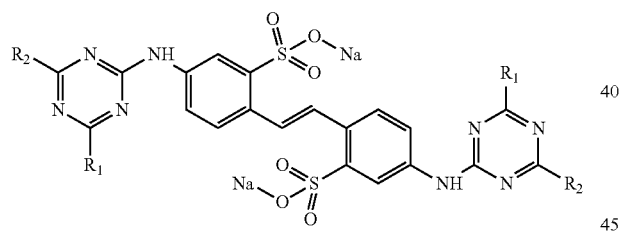

wherein the sodium methylene dinaphthalene sulfonates are chemical compounds, as shown in chemical formula (2), chemical formula (3) or chemical formula (4):

(2)

(3)

-continued (4)

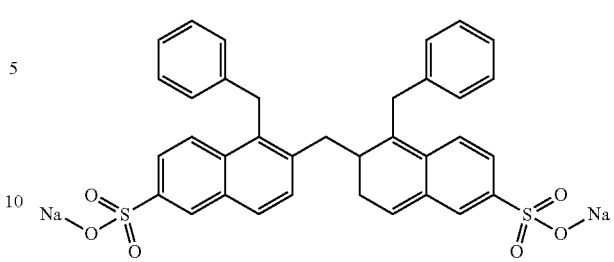

R$_1$ is a functional group, as shown in chemical formula (6), or chemical formula (7):

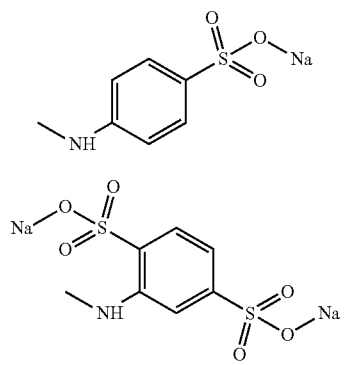

(6)

(7)

and R$_2$ is a functional group, as shown in chemical formula (8), chemical formula (9), or chemical formula (10):

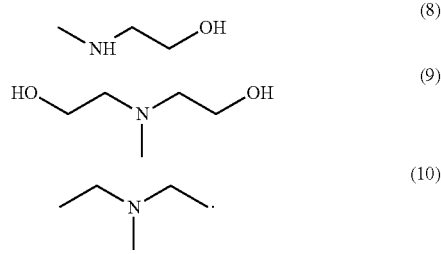

(8)

(9)

(10)

6. The pulp in claim 5 is non-wood pulp or wood pulp.

7. A method of brightening paper, comprising each of a pulp suspension liquid, a pulp slurry suspension and pulp or a combination thereof, adding an optical brightening agent composition, as claimed in claim 1, in each of a pulp suspension liquid, a pulp slurry suspension and pulp or a combination thereof, and manufacturing as well as drying a piece of paper.

8. The method of brightening paper as claimed in claim 7 wherein the optical brightening agent composition which has been diluted by water is added into each of a pulp suspension liquid, a pulp slurry suspension and pulp or a combination thereof.

9. The method of brightening paper as claimed in claim 8 wherein the weight percentage concentration of the optical brightening agent composition diluted by water is 0.1%.

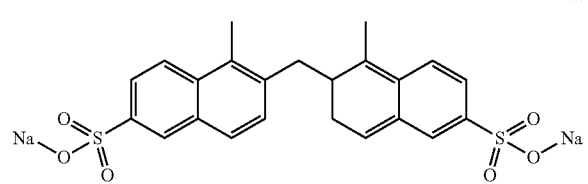
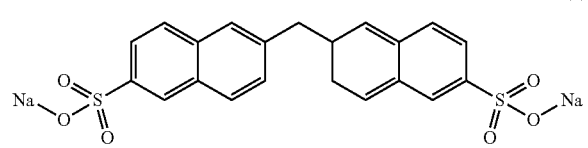

10. Paper or cardboards manufactured in a method of brightening paper as claimed in claim 7.

* * * * *